Patented June 9, 1931

1,809,454

UNITED STATES PATENT OFFICE

LORIN B. SEBRELL, OF SILVER LAKE, OHIO, ASSIGNOR TO THE GOODYEAR TIRE & RUBBER COMPANY, OF AKRON, OHIO, A CORPORATION OF OHIO

ALDOL CONDENSATION PRODUCTS AND VULCANIZATION OF CAOUTCHOUC THEREWITH

No Drawing. Original application filed November 10, 1924, Serial No. 749,040. Divided and this application filed December 4, 1929. Serial No. 411,692.

My invention relates to methods of vulcanizing rubber and rubber compounds, and it has, for its primary object, the provision of accelerators of high curing power and wide adaptability in the art.

This application is a division of application Serial No. 749,040, filed November 10, 1924.

In United States Patents Nos. 1,417,970 and 1,467,984 a number of reaction products having accelerating properties are disclosed, which result from the condensation of aldehydes with amines and the further condensation of this product with more aldehyde. The present invention, however, relates to the condensation, without the loss of water, of an aldehyde to give a product which can then be easily combined with amines, to form accelerators of high curing power, and which have the added advantage of being very stable toward heat and aging. Moreover, the product may be produced without loss of volatile materials, thereby obviating the need of an expensive apparatus which would be necessary to recover such materials.

It is also an object of this invention to provide a product which may be formed by the condensation, without the loss of water, of an aldehyde to form an aldol and by treating this material with an amine to obtain a material which, upon further treatment with an aldehyde, gives a desirable accelerator.

Another object of this invention is to provide a vulcanized rubber product having good aging properties, high tensile strength and which requires a short time of cure that may be prolonged, according to the requirements of the process, without detriment to such product.

By way of explanation, acetaldehyde will be used as an example, but it is known that other similar substances may be used with advantage. When acetaldehyde is treated with any one of a number of substances, which have the desired catalytic effect, among which are zinc chloride, potassium carbonate and hydrochloric acid, an addition product is obtained without the loss of water. The reaction is represented as follows:

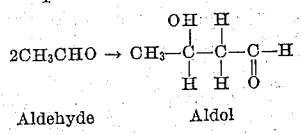

Aldehyde  Aldol

Chemically this substance can be likened to aldehydes and ketones. For example, it forms condensation products and gives the characteristic reactions with sodium bisulphite and hydroxylamine, but it differs in several important respects. Thus, it decomposes on heating at ordinary pressures to give dehydrated unsaturated compounds, chief among which is crotonaldehyde; this can be shown by the following reaction:

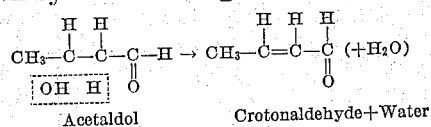

Acetaldol  Crotonaldehyde+Water

Acetaldehyde does not show this crotanaldehyde reaction. Furthermore, by treating acetaldehyde with aniline, ethylidine aniline is formed and if this material be further treated with HCN, the nitrile results. The latter may be decomposed with water to form the acid. But the aldol aniline addition product does not show this characteristic property of the aldehyde derivative. Thus, it is evident that not only are the starting materials different, but (as could only be expected) their reaction products are different. This is well brought out in Richter's Organic Chemistry, volume 2, "Translation from the 11 edition," page 91, line 9:

"The simple, as well as the polymeric, alkylidene-anilines" (that is the aldehyde-amine condensation products) "easily add hydrocyanic acid, with formation of the nitrites of α-anilido-carboxylic acids, also obtained by direct transformation of aniline salts, with aldehydes, and CNK (B.37,4073; 39,986, 2796). The aldoloid condensation products, on the other hand, do not add HCN; they behave like di-acid, di-secondary bases; they do add bromine, and must therefore be regarded as probably dianiline derivatives of the olefin-glycols, e. g. $CH_3CH(NCH_6H_5)CH:CH(NHC_6H_5)$."

I call attention to the misprint in line 11 which mentions the "nitrites of α-anilido-carboxylic acids." This, of course, should be "nitriles of α-anilido-carboxylic acids," as is brought out later in line 27, which speaks of the hydrocyanic acid addition products of ethylidine aniline as "the α-anilido-propionitrile." A graphical representation of the above notation can be represented as follows:

|  | +aniline | +HCN | +H$_2$O |
|---|---|---|---|
| aldehyde → | alkylidene aniline. | nitrile of anilido carboxylic acid. | analido carboxylic acid. |
| aldol → | aldol-aniline | no reaction | no reaction |

From what has been said above, it is evident that the chemical properties of aldol have changed considerably from those of the aldehyde from which it was formed, but the physical properties have undergone even a greater change.

In this particular case, acetaldehyde is a very fluid volatile liquid (B. P. 20–22° C), having a pungent disagreeable odor, whereas aldol is a viscous non-volatile liquid (B. P. 60–70° at only 12 mm. absolute pressure) without the offensive odor, and which decomposes when distilled at ordinary pressures.

The second step in my process utilizes the well-known properties of ketones, aldehydes and adols alike, namely, that of reacting with other substances or themselves, with the elimination of water, to produce a class of materials known as "condensation products." Thus, for example, aniline reacts with acetaldol to give acetaldol-aniline. The reaction products thus obtained is itself an excellent accelerator, but it may be made to further combine with either aldehydes, aldols or amines to give products of desirable activity and having properties which allow it to be easily handled in the various steps before vulcanization.

In the same way, as above described, acetaldol will react with ammonia, 1-4-amino-meta-xylene, ethylenediamine, ortho and para-toluidine, butylamine, diethylamine, methylaniline and other amines or mixtures thereof. A method of preparing specific condensation products embodied in my invention follows:

*Example 1*

Equimolecular portions of acetaldol and aniline are mixed directly in a flask, some heat is evolved during the resulting reaction, but not sufficient to volatilize the ingredients.

After the reaction has apparently completed itself, the product is allowed to remain at 100° C. for several hours, after which it is subjected to steam distillation, to remove any unreacted aniline and is finally dried.

When this condensation product was added to stock having the following formula:

```
100   parts rubber
  5   parts activator
  3   parts sulfur
  .5  part condensation product
``` the time required for vulcanization was found to be about thirty minutes and the product thus obtained elongated 845% at the breaking load of 164 kgs/cm$^2$.

*Example 2*

If the accelerating material, as prepared above, be treated with one-half mol of formaldehyde, and compounded in a stock, as above set forth, a 45 minute cure gives a product which at the breaking load of 160 kgs/cm$^2$ elongates 825% of its original length. This latter accelerator, however, has the advantage of being a solid and may, therefore, be more readily handled than a heavy semi-fluid.

*Example 3*

When one mol of acetaldol is dissolved in 500 c.c. of ether, NH$_3$ gas is passed through at 0° C. until the solution becomes saturated, and the ether is allowed to evaporate, a soft resinous material results which also possesses desirable accelerating properties. In this case, the ether serves to dissolve the ammonia and aldol, thereby bringing them in more intimate contact. The ether may be regarded as a carrier fluid, which makes the amine more readily available for condensation and thereby assures complete reaction. Any other fluid which will perform such functions may, of course, be used in place of ether. This material, when incorporated in rubber, gives a cure in 50 minutes and the product thus formed elongated 840% at the breaking load of 135 kgs/cm$^2$.

In the above tests, zinc oxide was used as an activator, but litharge or salts of lead or zinc, such as stearate, acetate, benzoate or other compounds will function in like manner and may be used without departing from the scope of my invention.

I have chosen to designate the products formed by applying the names of the ingredients used, largely because only in a few cases is the true structural formula known; furthermore, the products polymerize on standing and probably undergo some structural change. The following table gives examples of such products with the results of the physical tests when incorporated in a caoutchouc mix.

| Condensate of | Cure in minutes | Elong. per cent | Load in kgs./cm.² at break |
|---|---|---|---|
| o-toluidine and acetaldol | 30 @ 40# steam pressure | 865 | 150 |
| p-toluidine and acetaldol | 15 | 870 | 170 |
| 1-4-amino-m-xylene acetaldol | 30 | 865 | 160 |
| Ethylenediamine acetaldol | 15 | 825 | 180 |
| Benzylamine acetaldol | 45 | 825 | 160 |
| Allylamine acetaldol | 45 | 820 | 154 |
| n-butylamine acetaldol | 10 | 805 | 178 |
| Ammonia acetaldol | 50 | 840 | 135 |
| Aniline acetaldol | 60 | 785 | 130 |
| Aldol-aniline formaldehyde acetaldol | 45 | 825 | 160 |
| Diethylamine acetaldol | 55 | 860 | 130 |
| Dibutylamine acetaldol | 50 | 860 | 120 |

I have found that the addition of a small amount of a fatty acid or metallic salt thereof to the caoutchouc mixture materially aids the vulcanization and improves the aging properties. Another variation which may be practiced with desirable results is to combine the fatty acid with the accelerator before adding it to the caoutchouc. Whether there is a chemical reaction involved in this combination is not known, nevertheless, the physical properties of the condensation product are materially changed.

Since many apparently widely different embodiments of this invention may be made without departing from the spirit thereof, it is understood that I do neither limit myself to the specific examples herein set forth, nor am I limited or dependent upon the soundness of any theories herein presented, by way of explanation; and, although I have specifically described accelerators that may be utilized in promoting the vulcanization of rubber, it is obvious that minor changes may be made in the application of the examples of my invention without departing from the scope thereof and I desire therefore that only such limitations shall be imposed as are indicated in the appended claims.

What I claim is:

1. A method of vulcanizing caoutchouc that comprises admixing caoutchouc with a vulcanizing agent, incorporating in the mixture a product formed by the condensation of an aldol with an aliphatic amine, mixing an activator therewith and applying heat.

2. A method of vulcanizing caoutchouc that comprises admixing caoutchouc with a vulcanizing agent, incorporating in the mixture a product formed by the condensation of an aldol with ammonia, mixing an activator therewith and applying heat.

3. A method of vulcanizing caoutchouc that comprises admixing caoutchouc with a vulcanizing agent, incorporating in the mixture a product formed by effecting the addition of two molecules of an acetaldehyde without the elimination of water and causing this material to further react with a primary aliphatic amine, mixing an activator therewith and applying heat.

4. A method of vulcanizing caoutchouc that comprises admixing caoutchouc with a vulcanizing agent, incorporating in the mixture a product resulting from the reaction of acetaldol with butylamine, mixing an activator therewith and applying heat.

5. A method of vulcanizing caoutchouc that comprises admixing caoutchouc with a vulcanizing agent, incorporating in the mixture a product resulting from the reaction of acetaldol with ethylene-diamine, mixing an activator therewith and applying heat.

6. A method of vulcanizing caoutchouc that comprises admixing caoutchouc with a vulcanizing agent, incorporating in the mixture a product resulting from the reaction of acetaldol with ammonia, mixing an activator therewith and applying heat.

7. A vulcanized product formed by the reaction of caoutchouc, a vulcanizing agent, an activator and the product resulting from the reaction of an aldol with an aliphatic amine.

8. A vulcanized product formed by the reaction of caoutchouc, a vulcanizing agent, an activator, and the product resulting from the reaction of acetaldol with ethylene diamine.

9. A vulcanized product formed by the reaction of caoutchouc, a vulcanizing agent, an activator, and the product resulting from the reaction of acetaldol with butylamine.

10. A vulcanized product formed by the reaction of caoutchouc, a vulcanizing agent, an activator, and the product resulting from the reaction of acetaldol and ammonia in an ether medium.

11. A method of treating rubber which comprises vulcanizing it in the presence of a reaction product of aldol and a material having the formula

where R and R are materials selected from a group consisting of hydrogen and aliphatic hydrocarbon radicals.

12. A method of treating rubber which comprises vulcanizing it in the presence of a reaction product of acetaldol and a material selected from a group consisting of ammonia, ethylene diamine, allylamine, butylamine, diethyl amine and dibutyl amine.

In witness whereof, I have hereunto signed my name.

Signed at Akron, in the county of Summit and State of Ohio, U. S. A., this 3rd day of December, 1929.

LORIN B. SEBRELL.